United States Patent
Matsuoka et al.

(10) Patent No.: US 8,149,569 B2
(45) Date of Patent: Apr. 3, 2012

(54) SOLID ELECTROLYTIC CAPACITOR WITH CATHODE TERMINAL AND ANODE TERMINAL

(75) Inventors: Keiko Matsuoka, Osaka (JP); Shoji Umeda, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 414 days.

(21) Appl. No.: 12/268,484

(22) Filed: Nov. 11, 2008

(65) Prior Publication Data
US 2009/0128998 A1    May 21, 2009

(30) Foreign Application Priority Data
Nov. 20, 2007   (JP) ................. 2007-300908

(51) Int. Cl.
*H01G 4/228* (2006.01)
*H01G 9/00* (2006.01)

(52) U.S. Cl. ........................ 361/540; 361/528
(58) Field of Classification Search .......... 361/533, 361/538, 540, 532, 528, 523, 535, 529, 531, 361/539, 541
See application file for complete search history.

(56) References Cited

U.S. PATENT DOCUMENTS

| | | | | |
|---|---|---|---|---|
| 4,017,773 A | * | 4/1977 | Cheseldine | 361/532 |
| 4,097,985 A | * | 7/1978 | Morimoto et al. | 29/25.03 |
| 4,107,762 A | * | 8/1978 | Shirn et al. | 361/534 |
| 6,236,561 B1 | * | 5/2001 | Ogino et al. | 361/523 |
| 7,447,000 B2 | * | 11/2008 | Cheng et al. | 361/540 |
| 2004/0165338 A1 | * | 8/2004 | Arai et al. | 361/502 |
| 2007/0279841 A1 | | 12/2007 | Kim et al. | |
| 2009/0080146 A1 | * | 3/2009 | Horio et al. | 361/541 |

FOREIGN PATENT DOCUMENTS

| | | | |
|---|---|---|---|
| CN | 1523622 A | | 8/2004 |
| JP | 62150814 A | * | 7/1987 |
| JP | 02105513 A | * | 4/1990 |
| JP | 05182875 A | * | 7/1993 |
| JP | 10106889 A | * | 4/1998 |
| JP | 2001143966 A | * | 5/2001 |
| JP | 2001-167976 | | 6/2001 |
| JP | 2001-244145 | | 9/2001 |
| JP | 2004140124 A | * | 5/2004 |
| KR | 1020040010287 | | 1/2004 |
| KR | 1020060021178 | | 3/2006 |
| KR | 10-0755655 | | 9/2007 |

OTHER PUBLICATIONS

Korean Office Action for Korean Patent Application No. 10-2008-0086430 mailed on Oct. 20, 2010.
Korean Office Action dated Mar. 21, 2011 corresponding to U.S. Appl. No. 12/268,484, filed Nov. 11, 2008.
Chinese Office Action for Application No. 200810169923.4 issued on Jul. 20, 2011.

* cited by examiner

*Primary Examiner* — Jayprakash N Gandhi
*Assistant Examiner* — David M Sinclair
(74) *Attorney, Agent, or Firm* — Turocy & Watson, LLP

(57) ABSTRACT

A solid electrolytic capacitor including a capacitor element having an anode member and a cathode member, an anode terminal electrically connected with the anode member, a cathode terminal electrically connected with the cathode member, and a mold resin portion covering the capacitor element; wherein the cathode terminal has an upper step portion in face-to-face contact with the cathode member and a lower step portion exposed out of the mold resin portion and a bottom surface of the mold resin portion and an upper surface of the lower step portion of the cathode terminal are disposed in an approximately same plane.

7 Claims, 5 Drawing Sheets

PRIOR ART

SOLID ELECTROLYTIC CAPACITOR WITH CATHODE TERMINAL AND ANODE TERMINAL

BACKGROUND OF THE INVENTION

1. Field of the Invention

The invention relates to a solid electrolytic capacitor in which portions of an anode terminal and a cathode terminal connected with a capacitor element are exposed out of a mold resin portion without entering in the mold resin portion.

2. Description of the Related Art

As a conventional solid electrolytic capacitor, for example, a solid electrolytic capacitor having a structure shown in FIG. 5 has been known. The solid electrolytic capacitor is provided with a capacitor element 101 obtained by successively forming a dielectric layer, a cathode layer, and a cathode lead-out layer on a circumferential surface of an anode body in which an anode lead 121 is implanted, a mold resin portion 106, an anode terminal 107, and a cathode terminal 108. Portions of the anode terminal 107 and the cathode terminal 108 are exposed out of the mold resin portion 106 and the exposed portions are bent along the circumferential surface of the mold resin portion 106.

To produce such a solid electrolytic capacitor having the above-mentioned structure, it is required to carry out a process according to which the capacitor element 101 is coated with the mold resin portion 106 and thereafter the anode terminal 107 and the cathode terminal 108 exposed out of the mold resin portion 106 are bent along the circumferential surface of the mold resin portion 106. However, in the bending process, it is practically difficult to perpendicularly bend the anode terminal 107 and the cathode terminal 108 and thus, strain to a certain extent is generated. Due to this strain, the produced solid electrolytic capacitor becomes larger than standardized sizes and it results in a problem of defective products. Further, to bend the anode terminal 107 and the cathode terminal 108, a margin for bending is required and therefore the size of the mold resin portion 106 has to be large to a certain degree and accordingly, it is difficult to make the solid electrolytic capacitor compact and low in height and improve the volume efficiency of the capacitor element 101. Further, there is a problem that a lead-out distance from the anode lead 121 to the exposed portion to be the terminal of the anode terminal 107 and a lead-out distance from the cathode lead-out layer to the exposed portion to be the terminal of the cathode terminal 108 become long and accordingly, an ESR of a solid electrolytic capacitor is increased.

In order to solve the above-mentioned problems, solid electrolytic capacitors having structures as described in a Prior Art 1 (Japanese Unexamined Patent Publication No. 2001-244145) and a Prior Art 2 (Japanese Unexamined Patent Publication No. 2001-167976) have been proposed.

That is, in the Prior Art 1, there is proposed a solid electrolytic capacitor in which a bottom surface of a mold resin portion and both lower surfaces of an anode terminal and a cathode terminal exposed out of the mold resin portion are in a same plane. However, in production process of a solid electrolytic capacitor with such a structure, it is required to protect lower surfaces of the anode terminal and the cathode terminal with an insulating tape or the like in order to prevent the mold resin from penetrating the respective lower surfaces of the anode terminal and the cathode terminal at the time of molding after the anode terminal and the cathode terminal are connected respectively to the capacitor element. Further, since it is impossible to completely prevent from the penetration of the mold resin even if the insulating tape or the like is adhered to the lower surfaces of the anode terminal and the cathode terminal, there occurs a problem of defective products. Furthermore, it is required to form a space in an interface between an upper mold and a lower mold at the time of molding in consideration of the thickness of the insulating tape; however, the pressure of the molds to the insulating tape is not so high and it also results in a problem that the mold resin leaks to the adhered surface of the insulating tape.

On the other hand, in the Prior Art 2, the volume efficiency of a capacitor element is improved by decreasing the volume of a mold resin portion by insulating an anode terminal made of a first conductive sheet and a cathode terminal made of a second conductive sheet with an insulating sheet. However, to produce a solid electrolytic capacitor with such a structure, a process of adhering an insulating sheet to both conductive sheets to be the anode terminal and the cathode terminal is required. Further, with such a structure, the contact surface area between the capacitor element and the cathode terminal is narrowed and at the same time, the lead-out distance between the cathode layer of the capacitor element and the exposed portion of the cathode terminal becomes not smaller than the thickness of the insulating sheet and accordingly, there occurs a problem that the ESR of the solid electrolytic capacitor cannot be decreased.

SUMMARY OF THE INVENTION

In view of above circumstances, an object of the present invention is to decrease defects of products and improve production efficiency.

According to one aspect of the invention, there is provided a solid electrolytic capacitor comprising a capacitor element having an anode member and a cathode member, an anode terminal electrically connected with the anode member, a cathode terminal electrically connected with the cathode member, and a mold resin portion covering the capacitor element; wherein the cathode terminal has an upper step portion in face-to-face contact with the cathode member and a lower step portion exposed out of the mold resin portion and a bottom surface of the mold resin portion and an upper surface of the lower step portion of the cathode terminal are disposed in an approximately same plane.

Other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS (First Embodiment)

Figure 1:
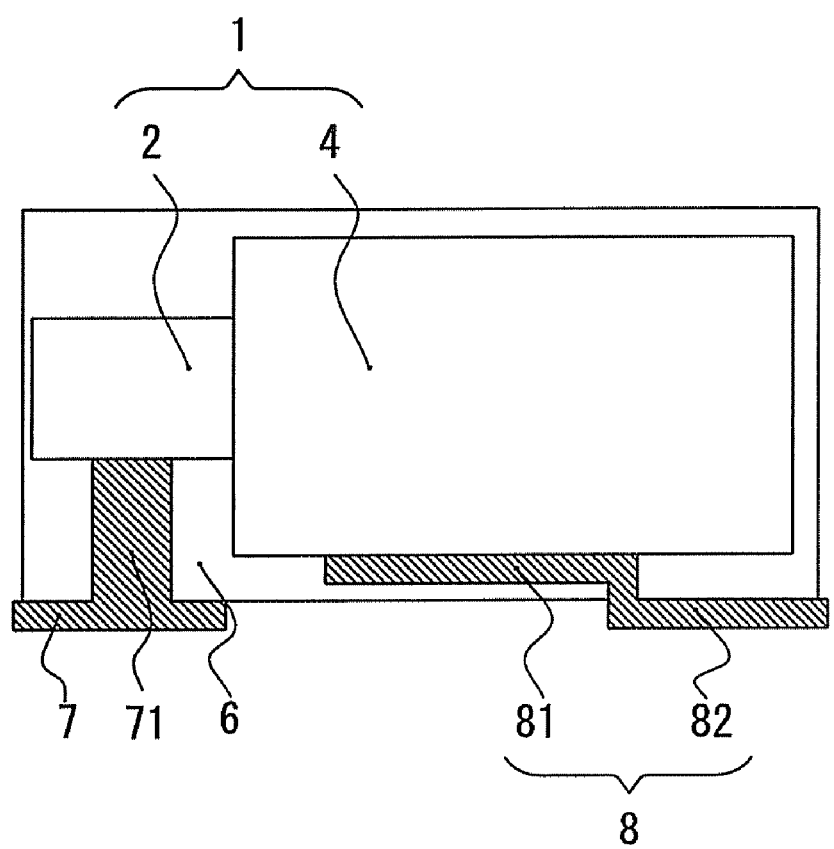
FIG. 1 is a cross-sectional view showing a solid electrolytic capacitor according to a first embodiment of the invention.
Figure 4:
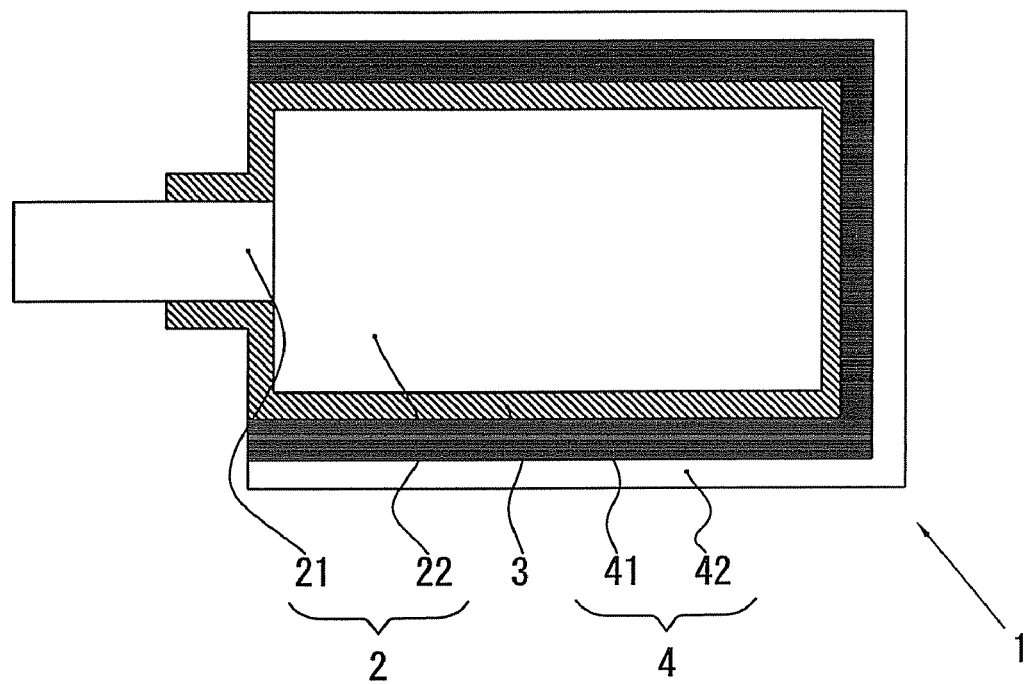
FIG. 4 is a cross-sectional view showing a capacitor element according to the first embodiment and the second embodiment of the invention.
Figure 5:
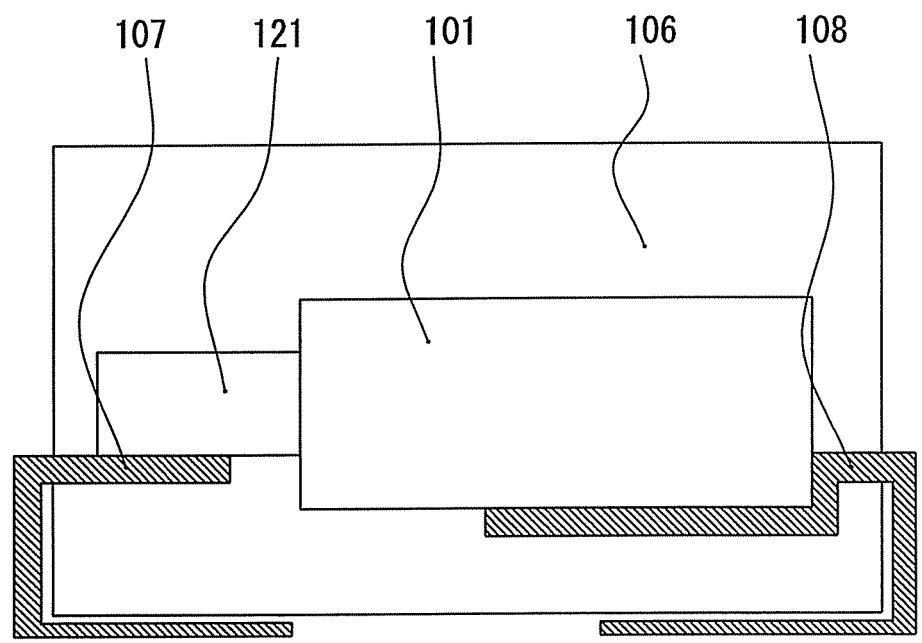
FIG. 5 is a cross-sectional view showing a conventional solid electrolytic capacitor.

FIG. 1 is a cross-sectional view of a solid electrolytic capacitor according to the first embodiment of the invention. The electrolytic capacitor comprises a capacitor element 1, a mold resin portion 6, an anode terminal 7, and a cathode terminal 8. At least respective lower surfaces and respective side surfaces of exposed portions of an anode terminal 7 and a cathode terminal 8 exposed out of a mold resin portion 6 are plated. The capacitor element 1 of the present embodiment has a structure shown, for example, in FIG. 4. That is, a dielectric layer 3 and a cathode member 4 including a cathode layer 41 and a cathode lead-out layer 42 are successively layered on a circumferential surface of an anode body 22 in which an anode lead 21 is implanted. As the anode lead 21, the anode body 22, the dielectric layer 3, the cathode layer 41 and a cathode lead-out layer 42, any of various materials that are known in the art forming solid electrolytic capacitors can be used. Each of the dielectric layer 3, the cathode layer 41 and a cathode lead-out layer 42 may be made of a single layer or a plurality of layers. Further, in the capacitor element 1, it is not necessary to use the anode body 22 in which the anode lead 21 is implanted, a metallic foil such as an aluminum foil may be used as the anode body 22.

In the present specification, an explanation is given by referring the anode lead 21 as an anode member 2 of the capacitor element 1, and the cathode layer 41 and the cathode lead-out layer 42 as a cathode member 4 of the capacitor element 1.

Figure 2:
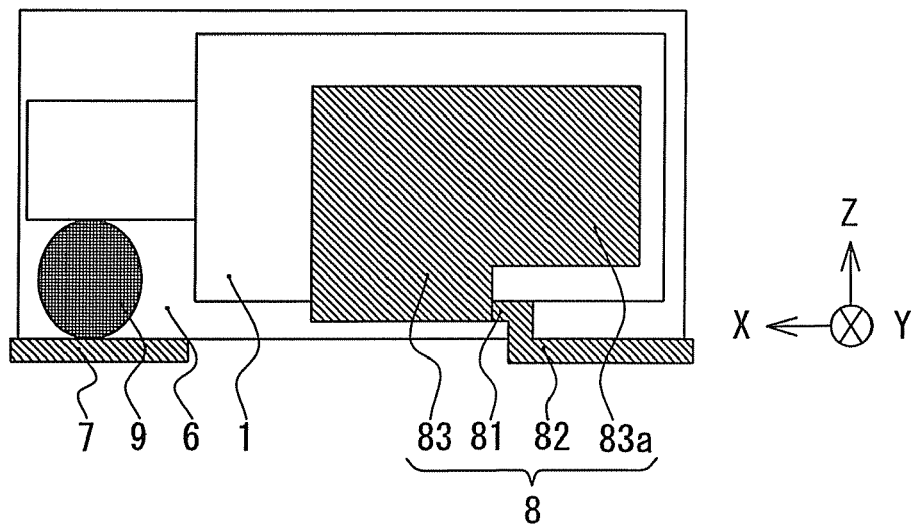
FIG. 2 is a cross-sectional view showing a solid electrolytic capacitor according to a second embodiment of the invention.

The anode member 2 and the cathode member 4 are connected with an anode terminal 7 and a cathode terminal 8, respectively. The anode terminal 7 has a rising portion 71 and the anode member 2 and the exposed portion of the anode terminal 7 are connected with each other via the rising portion 71. A shape of the anode terminal 7 is not particularly limited to the shape shown in FIG. 1. For example, the anode terminal 7 having a sufficient height for direct connection with the anode member 2 may be used or as shown in FIG. 2, the anode member 2 and the anode terminal 7 may be connected via a conductive member 9.

The cathode terminal 8 has an upper step portion 81 and a lower step portion 82 and a step part is formed between the upper step portion 81 and the lower step portion 82. The upper step portion 81 of the cathode terminal 8 is connected with the lower surface of the cathode member 4 in the inside of the mold resin portion 6 in such a manner that an upper surface of the upper step portion 81 of the cathode terminal 8 is in face-to-face contact with the lower surface of the cathode member 4. On the other hand, the lower step portion 82 of the cathode terminal 8 is exposed out of the mold resin portion 6. An upper surface of the lower step portion 82 of the cathode terminal 8 and a bottom surface of the mold resin portion 6 are disposed in an approximately same plane and the upper surface of the lower step portion 82 is brought into contact with the bottom surface of the mold resin portion 6. Namely, the upper surface of the lower step portion 82 of the cathode terminal 8 and the bottom surface of the mold resin portion 6 are disposed to be approximately flushed with each other.

The exposed portion of the anode terminal 7 and the lower step portion 82 of the cathode terminal 8 are respectively extended in the direction in which the anode member 2 and the cathode member 4 of the capacitor element 1 are aligned and exposed out of the mold resin portion 6. Those lower surfaces and side surfaces exposed out of the mold resin portion 6 are plated respectively. According to the above-mentioned configuration, at the time of mounting the solid electrolytic capacitor on a substrate, solder fillet can easily be observed.

(Second Embodiment)

FIG. 2 is a cross-sectional view of a solid electrolytic capacitor according to the second embodiment of the invention. The electrolytic capacitor comprises a capacitor element 1, a mold resin portion 6, an anode terminal 7, and a cathode terminal 8. The capacitor element 1 has the same structure as the first embodiment of FIG. 4. An anode member 2 is connected with the anode terminal 7 via a conductive member 9 and a cathode member 4 is connected with a cathode terminal 8. Herein, the shape, material, or the like of the conductive member 9 is not particularly limited and those which can connect the anode member 2 with the anode terminal 7 by a process such as resistance welding and which have conductivity in certain degree may be used.

Figure 3:
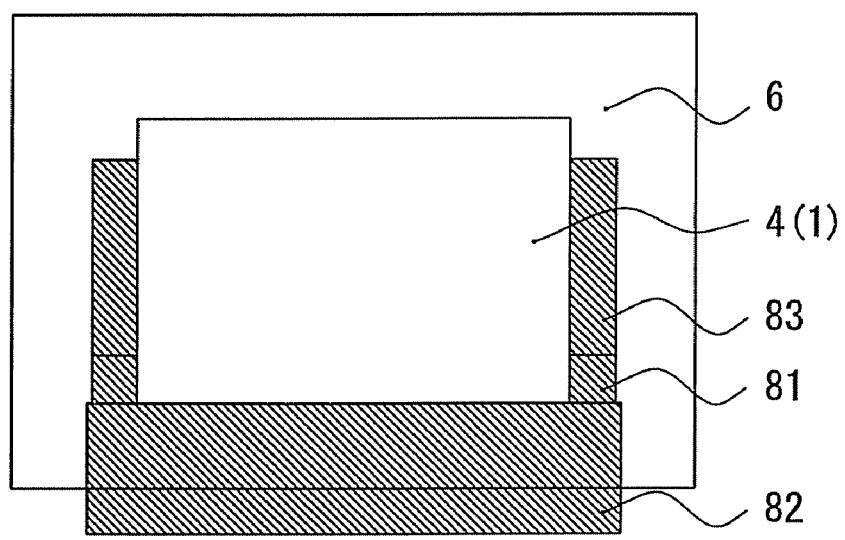
FIG. 3 is a schematic perspective view of the solid electrolytic capacitor of FIG. 2 observed from the X-direction.

The cathode terminal 8 has an upper step portion 81 and a lower step portion 82 and a step part is formed between the upper step portion 81 and the lower step portion 82. The upper step portion 81 of the cathode terminal 8 is connected with the lower surface of the cathode member 4 in the inside of the mold resin portion 6 and the lower step portion 82 of the cathode terminal 8 is exposed out of the mold resin portion 6. An upper surface of the lower step portion 82, a bottom surface of the mold resin portion 6, and an upper surface of the anode terminal 7 are disposed in an approximately same plane. Namely, the upper surface of the lower step portion 82, the bottom surface of the mold resin portion 6, and the upper surface of the anode terminal 7 are disposed to be approximately flushed with each other. The upper surface of the lower step portion 82 of the cathode terminal 8 and the upper surface of the exposed portion of the anode terminal 7 are respectively brought into contact with the bottom surface of the mold resin portion 6. Further, the cathode terminal 8 has a rising portion (side portion) 83 upwardly extending from both ends in the width direction of the upper step portion 81 to a direction approximately perpendicular to the direction in which the anode member 2 and the cathode member 4 are aligned. FIG. 3 is a schematic perspective view of the solid electrolytic capacitor of FIG. 2 observed from the X-direction.

As shown in FIG. 3, the rising portion (side portion) 83 is connected with side surfaces of the cathode member 4 of the capacitor element 1. According to the configuration, the contact surface area between the cathode member 4 and the cathode terminal 8 can further be widened and accordingly, the ESR of the solid electrolytic capacitor can further be lowered. In order to further widen the contact surface area between the cathode member 4 and the cathode terminal 8, it is preferable to form an extended portion 83a extending from the rising portion 83 as shown in FIG. 2. The extending direction of the extended portion 83a is not particularly limited; however, in a case where the rising portion 83 rises from a point nearest to the anode terminal 7 of the upper step portion 81, the extended portion 83a is preferable to be extended in the direction from the anode member 2 side toward the cathode member 4 side. By forming such a extended portion 83, the contact surface area between the capacitor element 1 and the cathode terminal 8 can further be widened and accordingly, the ESR of the solid electrolytic capacitor can further be lowered.

Further, in the present embodiment, the anode terminal 7 and the lower step portion 82 of the cathode terminal 8 is respectively exposed out of the mold resin portion 6 and those are extended in the direction in which the anode member 2 and the cathode member 4 are aligned, same as those of the first embodiment. Accordingly, at the time of mounting the solid electrolytic capacitor on a substrate, solder fillet can easily be observed and adhesion between the solid electrolytic capacitor and the substrate can be improved.

In the solid electrolytic capacitor of FIG. 2, the anode terminal 7 and the lower step portion 82 of the cathode terminal 8 is respectively exposed out of the mold resin portion 6 and side surfaces of the exposed portions are plated.

Accordingly, solder fillet can easily be observed at the time of mounting the solid electrolytic capacitor on the substrate.

As described above in detail, according to one aspect of the invention, there is provided a solid electrolytic capacitor comprising a capacitor element having an anode member and a cathode member, an anode terminal electrically connected with the anode member, a cathode terminal electrically connected with the cathode member, and a mold resin portion covering the capacitor element; wherein the cathode terminal has an upper step portion in face-to-face contact with the cathode member and a lower step portion exposed out of the mold resin portion and a bottom surface of the mold resin portion and an upper surface of the lower step portion of the cathode terminal are disposed in an approximately same plane.

According to the above-mentioned configuration, since the mold resin does not enter in the respective lower surfaces of the anode terminal and the cathode terminal, defects of products due to entering of the mold resin can be decreased. Further, since there is no need to protect the respective lower surfaces of the anode terminal and the cathode terminal with an insulating tape or the like at the time of molding, the production process can be simplified and accordingly, the production of a solid electrolytic capacitor is made easy and the production efficiency is improved. Furthermore, since there is no need to adhere an insulating tape or the like to the respective lower surfaces of the anode terminal and the cathode terminal, it is not required to form a space between the mold faces of an upper mold and a lower mold in consideration of the thickness of the insulating tape. Accordingly, the upper mold and the lower mold can be fitted without a gap. As a result, the mold resin can be prevented from leaking out of a boundary between the upper mold and the lower mold.

Further, it is preferable that the cathode terminal further has a rising portion (side portion) upwardly rising from the upper step portion in a direction approximately perpendicular to the direction in which the anode member and the cathode member are aligned and that the rising portion (side portion) is connected with at least one of side surfaces of the capacitor element. According to the above-mentioned configuration, since the contact surface area between the cathode member of the capacitor element and the cathode terminal is increased, the ESR of the solid electrolytic capacitor can be further lowered. The rising portion (side portion) is more preferable to be extended upwardly in both ends of the upper step portion in the width direction.

Furthermore, it is preferable that the rising portion (side portion) further has an extended portion extending from the anode member side toward the cathode member side in the direction in which the anode member and the cathode member are aligned. According to the above-mentioned configuration, the contact surface area between the cathode member of the capacitor element and the cathode terminal can further be widened and the ESR of the solid electrolytic capacitor can further be lowered.

According to one aspect of the present invention, it is made possible to prevent the mold resin from entering in the respective lower surfaces of the anode terminal and the cathode terminal. Therefore, defects of products due to entering of the mold resin can be decreased. As a result, production efficiency can be improved. Further, since there is no need to protect the respective lower surfaces of the anode terminal and the cathode terminal with an insulating tape or the like at the time of molding, a process of adhering an insulating tape or the like and a process of peeling the insulating tape or the like are not needed and thus, it is made possible to simplify the process of production. Accordingly, not only production efficiency can be improved, but also deterioration of yield of products can be prevented. Furthermore, according to the present invention, since the upper mold and the lower mold can be fitted without a gap, the mold resin can be prevented from leaking out of a boundary between the upper mold and the lower mold. Accordingly, defects of products due to leaking the mold resin can be decreased.

Although the present invention has been described in detail, the foregoing descriptions are merely exemplary at all aspects, and do not limit the present invention thereto. Various applications or modifications are possible within the literal or equivalent scope of the claims.

The present application claims a priority based on Japanese Patent Application No. 2007-300908 filed on Nov. 20, 2007, the contents of which are hereby incorporated by reference in its entirely.

What is claimed is:

1. A solid electrolytic capacitor comprising a capacitor element having an anode member and a cathode member, an anode terminal electrically connected with the anode member, a cathode terminal electrically connected with the cathode member, and a mold resin portion covering the capacitor element; wherein
   a lower surface of the anode terminal is exposed out of the mold resin portion,
   the cathode terminal has an upper step portion and a lower step portion that are disposed in a direction in which the cathode terminal and the anode terminal are aligned,
   an upper surface of the upper step portion is connected with a lower surface of the cathode member,
   a lower surface of the lower step portion is exposed out of the mold resin portion,
   at least a part of an upper surface of the lower step portion is opposed to a part of the lower surface of the cathode member via the mold resin portion,
   an upper surface of the anode terminal, the upper surface of the lower step portion of the cathode terminal, and a bottom surface of the mold resin portion between the cathode terminal and the anode terminal are disposed on an approximately same plane, and
   the anode terminal and the cathode terminal have respectively side surfaces exposed out of the mold resin portion and opposed to each other on the bottom surface of the mold resin portion.

2. The solid electrolytic capacitor according to claim 1, wherein the cathode terminal further has a side portion extending from the upper step portion and the side portion is connected with a side surface of the capacitor element.

3. The solid electrolytic capacitor according to claim 2, wherein the side portion is upwardly extended from both ends in the width direction of the upper step portion to a direction approximately perpendicular to the direction in which the anode member and the cathode member are aligned.

4. The solid electrolytic capacitor according to claim 2, wherein the side portion further has an extended portion extending in a direction in which the anode member and the cathode member are aligned.

5. The solid electrolytic capacitor according to claim 4, wherein the extended portion is extended from an anode member side to a cathode member side.

6. The solid electrolytic capacitor according to claim 2, wherein the side portion is longer than the upper step portion in the direction in which the cathode terminal and the anode terminal are aligned.

7. The solid electrolytic capacitor according to claim 1, wherein the upper step portion is closer to the anode member than the lower step portion in the direction in which the cathode terminal and the anode terminal are aligned.

* * * * *